United States Patent [19]

Hallal et al.

[11] Patent Number: 4,868,040
[45] Date of Patent: Sep. 19, 1989

[54] ANTIBALLISTIC COMPOSITE ARMOR

[75] Inventors: Alfred J. Hallal; John Arsenault, both of Montreal; Robert Guillemette, Bellefeuille, all of Canada

[73] Assignee: Canadian Patents & Development Limited, Ottawa, Canada

[21] Appl. No.: 260,275

[22] Filed: Oct. 20, 1988

[51] Int. Cl.[4] ............................................... B32B 7/00
[52] U.S. Cl. ..................................... 428/251; 428/246; 428/911; 428/920
[58] Field of Search ................ 428/246, 251, 920, 911

[56] References Cited

FOREIGN PATENT DOCUMENTS 797509 10/1968 Canada .
799705 11/1968 Canada .
2190077 11/1987 United Kingdom .

Primary Examiner—James J. Bell
Attorney, Agent, or Firm—Juliusz Szereszewski

[57] ABSTRACT

The present invention relates to a unitary anti-ballistic composite armor of the type which comprises a base layer element and an energy absorbing body, the base layer element comprising a plurality of layers of reinforcing fibrous material embedded, in laminar relationship, in an organic polymeric shatter-resistant matrix, the base layer element also being adapted to entrap particles produced on impact of a projectile with said energy absorbing body. The composite armor in accordance with the present invention is characterized in that it also includes
  a frontal layer element, and
  said energy absorbing body is disposed between
  the frontal and base layer elements, said frontal layer element comprising a plurality of layers of reinforcing fibrous material embedded, in laminar relationship, in an organic shatter-resistant polymeric matrix, said frontal layer element being capable of deforming the geometry of the projectile, and said energy absorbing body being bonded to said frontal and base layer elements.

28 Claims, 1 Drawing Sheet

ANTIBALLISTIC COMPOSITE ARMOR

The present invention relates to a composite armor of the type which comprises a base layer element and an energy absorbing body for providing protection from objects such as high speed projectiles, including ballistic fragments.

Various types of composite armor are known (see U.S. Pat. Nos. 4,048,365, 4,084,028, 4,090,005, 4,486,491, 4,623,574 and 4,647,493; Canadian Pat. Nos. 799,705 and 797,509; see as well UK patent application No. 2,190,077).

A known type of composite armor may generally comprise two basic elements, as follows, namely:

a base (backing) element for particle containment which may comprise a plurality of laminae of fibrous material embedded in a resinous matrix; and an energy absorbing body (comprising, for example, one or more layers of material such as ceramic tiles, rods etc . . .) disposed on the frontal face of the base element, the energy absorbing body being impact shatterable for absorbing kinetic energy of a projectile.

The major energy absorption for such a two part composite occurs on impact of the projectile with an element of the energy absorbing body. The energy dissipation mechanism is not fully understood but it is believed the on impact kinetic energy is dissipated by inducing the shattering of the energy absorbing element, such as a ceramic tile, and transferring kinetic energy to the so created debris of the element over a wide area relative to the area of the projectile. The projectile itself fragments as it passes through the debris which tends to be held in place by the underlying base element, thus dissipating more kinetic energy. The particles (or fragments) of projectile and energy absorbing element (e.g. ceramic tile) are then contained by the base element, such containment also absorbing kinetic energy.

For the purposes herein, it is to be understood that any reference to "an energy absorbing body" shall mean or be taken as a reference to "a plurality of energy-dissipating means of a predetermined size and shape individually shatterable in response to the impact of a high kinetic energy projectile thereagainst to thus dissipate kinetic energy of the projectile".

In relation to the above definition it shall also be understood that a plurality of energy-dissipating means may be disposed in side-by-side relationship to each other so as to define a layer of energy-dissipating means and that the energy absorbing body may comprise one or more such layers.

In addition to the two basic elements, an outer fabric layer, overlaying an energy absorbing body (e.g. tiles), is also briefly mentioned in Canadian Pat. No. 799,705. It is indicated only that the fabric layer serves to retain the shattered pieces of tile and prevent fragments thereof from coming off or from being expelled away from the armor; see also Canadian Pat. No. 797,509.

It would be advantageous to have a composite armor (e.g. of non-metallic materials), the composite having effective penetration resistance for absorbing the kinetic energy of a projectile.

It would be advantageous to have a composite armor (e.g. of non-metallic materials), the composite being capable of effectively fragmenting a projectile and absorbing the kinetic energy of the projectile.

It would be advantageous to have a composite armor (e.g. of non-metallic materials), the composite being capable of being cured (i.e. formed) not only into flat, plate-like structures but also into curved structures which can effectively fragment a projectile and absorb the kinetic energy of the projectile.

It would be advantageous to have a composite armor (e.g. of non-metallic materials) able to stop a projectile wherein a frontal element can deform the geometry of a particle and in this way participate in the dissipation of the energy of the projectile and thus increase the energy absorption power of the armor as a whole.

It would be advantageous to have a lightweight composite armor.

SUMMARY OF INVENTION

In general, the present invention provides a unitary antiballistic composite armor comprising a base layer element, and an energy absorbing body, said base layer element comprising a plurality of layers of reinforcing fibrous material embedded in laminar relationship, in an organic polymeric shatter-resistant matrix, said energy absorbing body comprising a plurality of energy-dissipating means of a predetermined size and shape individually shatterable in response to the impact of a high kinetic energy projectile thereagainst, said base layer element being adapted to entrap particles produced on impact of the projectile with said energy absorbing body, characterized in that the composite includes a frontal layer element, and said energy absorbing body is disposed between the frontal and base layer elements, said frontal layer element comprising a plurality of layers of reinforcing fibrous material embedded, in laminar relationship, in an organic shatter-resistant polymeric matrix, said frontal layer element being capable of deforming the geometry of the projectile, and said energy absorbing body being bonded to said frontal and base layer elements.

In accordance with the present invention, the frontal layer element may, for example, comprise a plurality of layers of reinforcing woven fabric embedded, in laminar relationship, in an organic shatter-resistant polymeric matrix. Similarly, the base layer element may, for example, also comprise a plurality of layers of reinforcing woven fabric embedded, in laminar relationship, in an organic shatter-resistant polymeric matrix.

In accordance with the present invention, the reinforcing fibrous material may, for example, be made of a fiber glass, a ceramic material, or other polymeric material, etc . . . .

In accordance with the present invention, the reinforcing woven fabric may, for example, be a woven fabric which comprises a plurality of layers formed of yarns disposed in straight manner.

In accordance with the present invention, the reinforcing fibrous material may, for example, be a woven fabric which has an impact strength of 200 ft-lb/in$^2$ or higher; it may have a weave as referred to above; and it may be made of materials such as those referred to above or hereinafter.

The composite armor, in accordance with the present invention, may, as desired, also include additional layer elements.

More particularly, according to the present invention, it has been found that the penetration resistance of a composite comprising a base layer element and an energy absorbing body may be enhanced by the addition of a frontal layer element adapted to deform the geometry of the projectile before the projectile impacts on the energy absorbing body. For example, if the projectile has a pointed tip, the desired effect of deformation is to increase the impact surface area of the leading face of the projectile. The greater the surface area of the leading face of the projectile, the greater the surface contact between the projectile and an element of the energy absorbing body. A larger impact surface area means that a greater amount of energy dissipation will occur on impact; energy dissipation being due not only to shattering of an element of the energy absorbing body but also due to fragmentation of the projectile itself. Additionally, the larger surface area of the leading face of the projectile will bring about some energy absorption due to increased resistance between the frontal layer element and the enlarged leading face of the projectile.

The composite of the present invention is of unitary construction. In other words, the three basic elements are laminated or bonded together so as to form a unitary mass. The various layers and their constituent laminae may, if desired, be bonded so as to be delaminatable, delamination on impact also absorbing energy. On the other hand, the composite may, if desired, be such as to resist delamination. If other layer elements are present they likewise are bonded to the other members of the composite so as to provide a unitary mass.

The frontal layer element as in the case of the base layer element may serve to absorb impact fragments in it's mass; i.e. the frontal layer element and the base layer element may both serve to confine or contain, within their respective mass, particles of energy absorbing body (e.g. ceramic tile particles) or particles of projectile, which are generated on impact and which rebound backward or travel forward as the case may be. In this manner, the armor may also offer protection from impact shrapnel induced by impact of the projectile with a member of the energy absorbing body. The frontal layer element and the base layer element may be of the same or different construction.

Preferably, the composite armor is constructed so as to be relatively lightweight. In order to facilitate such lightweight construction, the frontal layer element may, for example, comprise laminae made up from a high impact strength woven fabric, i.e. a woven fibrous material having, for example, an impact strength of 200 ft-lb/in$^2$ or greater. The use of a high impact strength material generally means that less overall material is needed in order to achieve a given degree of protection than if a material of lesser impact strength is used; the lesser impact strength material generally would require a thicker (i.e. heavier) frontal layer element in order to provide the same degree of protection. The discussion which follows will refer in particuler to high impact strength material (e.g. a material based on a fiber glass, etc . . .), but only by way of illustration since any other fibrous material may be used for the composite frontal layer element so long as the frontal layer element obtained therefrom is capable of deforming the geometry of the projectile.

Thus, the present invention, as indicated above, generally provides a composite protective armor of unitary construction consisting of three elements. The three basic elements of the composite armor of the present invention comprise:

a frontal layer element (capable of blunting or deforming the geometry of the projectile);

a base layer (backing) element (capable of particle containment); and an energy absorbing (e.g. ceramic) body disposed or sandwiched therebetween.

The composite armor may, however, as indicated above include other layer elements. For example, the composite armor may include an auxiliary outer layer element which is bonded to the frontal layer element, the frontal layer element being disposed between said auxiliary outer layer element and said energy absorbing body. The composite may, alternatively or additionally, include a second auxiliary outer layer element which is bonded to the base layer element, the base layer element being disposed between said second auxiliary outer layer element and said energy absorbing body. These auxiliary outer layer elements may, for example, be adapted to provide fire protection for their respective underlying layer element. They may comprise a plurality of layers of reinforcing fibrous material embedded, in laminar relationship, in an organic shatter-resistant polymeric matrix; the reinforcing fibrous material of these auxiliary outer layer element may be made of a ceramic material and may be woven fabric made of such a material. Such further layer elements will be referred to more particularly below.

In any event, it should be understood that the effectiveness of armor in accordance with the present invention is a function of the type of projectile it is intended to stop. Thus, the materials of construction, thickness of the elements, number and disposition of reinforcing laminae, degree of geometric deformation, etc . . . will vary, within the confines of the present invention, in accordance with the type of projectile to be stopped; the details of construction will depend on such factors as the anticipated size, shape, weight of the projectile as well as its velocity on impact. The present description is to be read keeping this in mind.

In drawings which illustrate example embodiments of the present invention:

Figure 1:
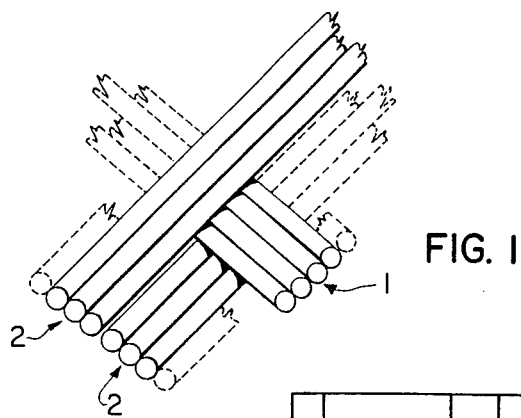
FIG. 1 is a perspective view of a portion of a woven fabric having a straight weave.

As indicated above, the frontal layer element serves to induce break-up of the geometry of the projectile. The frontal layer element does so by rendering the leading face of the projectile blunter or flatter prior to impact with the energy absorbing body i.e. by intiating an increase in the surface area of the leading face of the projectile. Desirably, the frontal layer element also inhibits backward travel therethrough of particles of the energy absorbing body or the projectile after impact (i.e. to inhibit ricochet).

The frontal layer element may take on any form or construction and may be made up of any suitable materials, provided that the frontal layer element obtained therefrom has the desired ballistic quality i.e. it induces geometric deformation of the projectile.

The frontal layer element may thus consist of any suitable shatter-resistant polymeric matrix reinforced with suitable fibrous material(s). The frontal layer element may consist of a plurality of laminae of matrix impregnated fibrous material in sheet form (e.g. a woven fabric), the layers thereof being laminated together as part of the unitary mass of the composite.

Any fibrous material incorporated into the frontal layer element should, of course, be able to contribute to the desired ballistic quality of the frontal layer element.

Preferably, as indicated previously, the composite armor is constructed so as to be relatively lightweight. In this context, the frontal layer element may, for example, comprise laminae made up from a high impact strength woven fabric, such as a woven fabric having an impact strength or resistance of about 200 ft-lb/in$^2$ or greater e.g. an impact strength in the range of from about 200 to about 500 ft-lb/in$^2$ (for a definition of "impact strength" see "ENGINEERED MATERIALS HANDBOOK", vol. 1, COMPOSITES, ASM INTERNATIONAL, 1987; "impact strength" in units of ft-lb/in$^2$ may be determined per ASTM D-256 as applied to a woven fabric or by a similar method). In any event, the impact strength of a fabric should be such that when the fabric layers are embedded in a matrix the obtained frontal layer element will cut into the geometry of the projectile causing or inducing blunting or an increase in surface area of the leading face of the projectile. Preferably, the tensile strength of the fiber or yarn making up the fabric should be such that the fiber strands can effectively resist being sheared under impact conditions. In general, the higher the impact strength of the fabric and, preferably, the higher the tensile strength of the fiber or yarn making up the fabric, the more apt a fabric is for use in relation to the present invention (i.e. for a lightweight armor composite in accordance with the present invention).

In the following discussion reference will be made, by way of example only, to particular fabrics.

Ballistic quality fabric, which may be used in accordance with the present invention, may be made of organic or inorganic fibers or yarns of high tensile strength. Inorganic fibers or yarns may, for example, be made of glass or other suitable inorganic material. Organic fibers or yarns may, for example, be made of polyethylene or an aramide. Polyethylene yarn may be obtained under the trade mark Spectra from Allied Fibers which is a division of Allied Corporation U.S.A. or under the trade designation Dyneema SK60 from Dyneema V. of Holland. An aramide yarn may be obtained from Dupont Company U.S.A. under the trade mark Kevlar.

The fibrous material, preferably, is made of glass fiber such as S glass, e.g. S-2 glass. S glass refers to a family of high strength glass fibers or yarn (see "Engineer's Guide to Composite Materials", American Society for Metals 1987 at 5-14). S-2 glass is a trademark of Owens-Corning Fiberglass Corporation and refers to an S glass fiber obtainable from this company which can be used to make a woven fabric as mentioned herein.

The fibrous material may thus, for example, comprise a woven fabric such as a high tensile strength fabric of S-2 (fiber) glass. In the context of the present invention high tensile strength woven fabric refers, for example, to a fabric having a weave which interferes as little as possible with the availability of the full tensile strength of the fiber or yarn across at least a substantial portion of the length of the fibers or yarn thereof.

With respect to weave, if it is desired to minimize the amount of material in the frontal layer element then the fabric, preferably, is one which is tightly woven with the fiber strands abutting or being closely adjacent to one another. If a loosely woven fabric is used then generally a larger number of laminae may be necessary in order to achieve the same degree of blunting (by the frontal layer element) which may be obtainable by a lesser number of laminae when using a fabric of tighter weave.

Desirably, as mentioned above, the fabric has a weave which interferes as little as possible with the availability of the full tensile strength of the fiber or yarn across the length of the fibers or yarn thereof. A suitable fabric may be used which is woven in accordance with the teachings of U.S. Pat. No. 4,748,996, the fabric being made of S-2 glass.

In general, in accordance with U.S. Pat. No. 4,748,996, the yarn making up the warp and respective fill of a fabric are each disposed in a unidirectional manner i.e. the yarns are arranged in the fabric in a straight manner and not in a wavy or tortuous way. More particularly, this patent discloses a woven multi-layered fabric having a plurality of layers formed of straight yarns. The plurality of layers includes at least one layer formed of straight warp yarns and a pair of respective layers formed of straight fill yarns, the fill layers being disposed on opposite sides of the warp layer. The filling yarns are in superposed relation and extend at right angles to the warp yarns. Binder warp yarns interconnect the straight warp and filling yarns of the layers. The binder yarns also serve to maintain the filling yarns in the aforesaid superposed relation. The binder yarns themselves are arranged in cooperating pairs. One binder yarn of each pair is woven in opposition to the other binder yarn of the pair so that one binder yarn extends over certain superposed filling yarns and under certain other superposed filling yarns while the other binder yarn of the pair extends under said certain superposed filling and over said certain other superposed filling yarns. FIG. 1 illustrates, in somewhat exaggerated form such a weave, namely a number of the straight strands of the warp 1 and a number of the straight strands of the fill 2; binder strings (not shown) may be used to maintain the integrity of the fabric. In the FIG. 1 the strands abut each other i.e. the weave is tight; for further details see U.S. Pat. No. 4,748,996.

Fabric made with other weaves and-or other types of materials (e.g. polyethylene, aramids, etc . . .) may be used but may necessitate having to accept that the product may be relatively thicker and/or heavier, depending on the characteristics of the weave and the other materials.

Suitable fabric made from S-2 glass may be obtained from J. B. Martin Limitee, St-Jean-sur-Richelieu, Quebec, Canada under the trade designation Martintek-NCS-S2 (449AA (1250×750) having a polyester binder of 14-444 TEX).

The fabric for a given lamina may be rotated with respect to the alignment direction of another fabric lamina so as to maximize properties such as rigidity, vibration dampling, etc . . . ; e.g. rotation as between the warp of any two laminae may be from 0 to 90 degrees. Preferably such rotation is 0/90 degrees.

The organic polymeric matrix incorporated into the frontal layer element should, of course, also be able to contribute to the desired ballistic quality of the frontal layer element. The organic polymeric matrix can, for example, be formed of any suitable thermosetting or thermoplastic resin as long as the matrix can effectively resist shattering on impact of the projectile and thus inhibit the spalling effect and the throwing back of fragments through the frontal layer element. If desired, the polymeric material may also be such as to resist delamination on impact.

The shatter-resistant organic polymeric matrix in which the fabric is embedded may, for example, be a vinyl ester resin matrix, polyester resin matrix, epoxy, etc.

The shatter-resistant organic polymeric matrix may be obtained using a thermosetting resin such as a vinyl ester which is based on an epoxide. Such a vinyl ester resin has been disclosed as having the following typical structure:

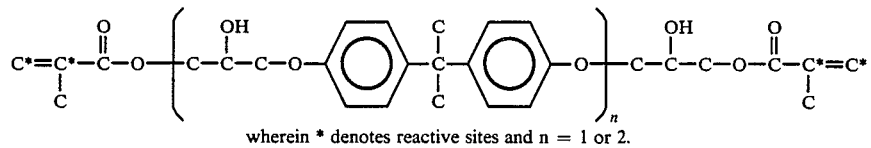

wherein * denotes reactive sites and n = 1 or 2.

An example of a suitable resin of this type is available from the Dow Chemical Company under the trade designation DERAKANE 510N, DERAKANE being a trademark; this resin is a brominated, epoxy novolac-based vinyl ester. Other suitable resins include polyester resins which may be obtained from Fiberglass Canada Inc. under trade designation Dion COR-RES 6695 FR.

The shatter-resistant organic polymeric matrix preferably should be able to effectively coat or impregnate the fibers of the woven fabric.

The woven fabric may be impregnated with from about 25 to 50 percent by weight of resin based on the total weight of the impregnated sheet or fabric.

It may be desirable to provide, on the outer face of the frontal layer element, some decorative means. It may also be desirable to have means, on the outer face of the frontal layer element, which will provide fire protection to the underlying structure of the composite; i.e. means for maintaining the physical integrity and mechanical properties (i.e. ballistic characteristics) of the frontal layer element in the face of extreme heat or flame erosion during a fire. Such decorative or fire protection element may also be so constructed so as to participate in the geometric deformation of the projectile.

Accordingly, if desired, the composite may (as indicated previously) also additionally include an auxiliary outer layer element overlaying and bonded to the frontal layer element. This auxiliary outer layer element may comprise one or more layers of fibrous material embedded, in laminar relationship, in an organic polymeric shatter-resistant matrix. The element can be adapted to serve to protect against fire propagation, to protect against flame spread, to limit smoke/toxic gas emission, to add a decorative finish to the outer surface of the composite, to serve as a preliminary abrasive to commence deformation of the projectile, etc. ... or any combination thereof.

The presence of such an auxiliary outer layer element means that the energy absorbing body will be covered with two layer elements, namely: a first covering layer element (i.e. an auxiliary layer element) and a second underlying blunting layer element (i.e. a frontal layer element). Both of these elements are desirably configured to inhibit backward travel therethrough of particles of the energy absorbing body or the projectile after impact (i.e. to inhibit ricochet).

The choice of fibrous material to use for the auxiliary outer layer element depends on the characteristic(s) that it is desired to have. If the auxiliary outer layer element is only to have a decorative or fire protection function then the fibrous material used for it's construction does not have to have the same strength characteristrics as the fibrous material used for the underlying frontal layer element. A fibrous material having impact strength and/or tensile strength characteristics which are lower than those for the frontal layer element may be used.

However, preferably, the auxiliary outer (facing) layer element in addition to providing fire protection may also be of a kind which can induce some geometric deformation (i.e. as a preliminary abrasive) of the projectile. In this latter case the fibrous material may be of ballistic quality although not necessarily at the same level as for the frontal layer element. The fibrous material for the auxiliary outer facing layer element may therefore, for example, comprise an inorganic (ceramic) fabric having high compressive strength. A suitable ceramic fabric may be obtained from the 3M company which is made from a material available from this company under the trade designation Nextel 312 which has a tensile strength of 250,000 psi and a tensile modulus of $22 \times 10^6$; e.g. such a woven fabric designated as AF-30 is available from 3M. The Nextel 312 fibers making up the AF-30 fabric are made out of (by weight) 62% aluminum oxide ($Al_2O_3$), 14% boron oxide ($B_2O_3$) and 24% silicon dioxide ($SiO_2$).

The organic polymeric matrix in which the fibrous material of the auxiliary outer facing layer element is embedded, may be the same as (or, if different, compatible with) the polymeric matrix of the frontal layer element. For example, the organic polymeric matrix may, generally, be of the same type as is used for the frontal layer element as referred to above. However, in this case, the matrix may, if desired, contain additives which alter or enhance it's characteristics; such additives are known. For example, it may be desired that the matrix have high fire retardant properties; e.g. see Can. Pat. No. 799,705. If the polymeric material of the matrix does not itself have such properties, it may be possible to incorporate into the polymeric material a fire retardant material so as to provide such characteristic. A composition based on DERAKANE 510N, which already has good flamespread properties, may, for example, be used directly; however, if desired, an additive such as alumina trihydrate may be added to the resin in order to cut down on gas toxicity and smoke emission.

The auxiliary outer layer element may be bonded (i.e. fixed) to the frontal layer element in any suitable manner and by any suitable means. Thus bonding may be effected by means of any suitable substance which will effectively bond the frontal layer element and the auxiliary outer layer element together provided that such bonding material is (chemically) compatible with the polymeric matrix material used for these elements (e.g. it may be a compatible organic polymeric substance). The bonding agent may, for example, be a vinyl ester, a polyester or epoxy as referred to above; i.e. the bonding agent may be based on the same resin ingredients used for the matrix of the layer elements.

A sufficient number of laminae or layers are, of course, to be used for the frontal layer element and, if present, the auxiliary outer layer element so as to provide the desired characteristics i.e. in the case of the frontal layer element the desired level of geometric deformation of the projectile. The frontal layer element may, for example, include from 6 to 8 lamina of S-2 glass fabric (see above); and the auxiliary outer layer element may, for example, include from 2 to 4 lamina of 3M ceramic fabric (see above).

In any event, it is to be understood that, depending on the choice of materials, the frontal layer element is to be of sufficient thickness and construction so as to serve to initiate break-up of the geometry of the projectile prior to impact with the energy absorbing body.

As mentioned above, the energy absorbing body is sandwiched between the frontal layer element and the base layer element. Various forms and dispositions of energy absorbing bodies or elements are known with respect to composite armor; see the previously mentioned patents and in particular U.K. patent application No. 2,190,077.

The energy absorbing body may consist of any suitable material whereby the kinetic energy of a projectile can be absorbed by fracturing or shattering of the material on impact with the projectile. The energy absorbing body may be a ceramic body element. The energy-dissipating means of the energy absorbing body may, for example, be in the form of strips or tiles of an inorganic hard ceramic material, such as aluminum oxide, boron carbide, silicon carbide, etc. ... The tiles may be square, triangular or polygonal in shape and have major opposing surfaces which are flat. The tiles may be arranged in side by side arrangement in a single layer or a plurality of layers. The adjacent tiles may be closely spaced apart from each other or even abut each other so that the combined major surface area of the tiles is substantially equal to the surface area of the exposed face of the frontal layer element (i.e. the face exposed to initial impact with the projectile). If a plurality of tile layers is used the tiles of the layers may be staggered with respect to tiles of another layer i.e. covering any space separating one lower tile from another adjacent lower tile. Individual tiles may, for example, be squares 0.25 inches thick and 4 inches long per side.

As mentioned above, the (ceramic) energy-dissipating means may alternatively be in the form of strips; this form may be beneficial to the fabrication process because the strips may be easier to manipulate during the lay-up process and can facilitate the formation of complex shapes (i.e. curved forms).

As also mentioned above, the energy absorbing body may be composed of any suitable material which can dissipate the kinetic energy of a projectile by shattering on impact with the projectile. An energy absorbing element may be used, for example, which has a hardness in the range of from about 75 to about 79 (on a Rockwell 45N) or higher.

Suitable tiles may be obtained from Les Refractaires Certel Ltee, Ville St-Laurent, Quebec, Canada; available tiles include square tiles (4"×4"×0.25") made of alumina (i.e. aluminium oxide).

As in the case of the auxiliary outer layer element, the energy absorbing body may be bonded (i.e. fixed) to layer elements in any suitable manner and by any suitable means. The bonding may be effected by means of any suitable substance which will effectively bond the energy absorbing body to other members of the composite provided that such bonding material is (chemically) compatible with the polymeric matrix material used for the other layer elements (e.g. it may be a compatible organic polymeric substance). The bonding agent may, for example, be a vinyl ester, a polyester or epoxy as referred to above; i.e. the bonding agent may be based on the same resin ingredients used for the matrix of the layer elements.

It is to be understood that if the energy absorbing body comprises two or more layers of energy-dissipating means that the layers are bonded to each other by a bonding agent as described above.

The base layer element is intended to act to limit forward travel therethrough of particles (or fragments) of projectile (or tile) after impact; such base layers are known, see, for example, the previously mentioned patents. In accordance with the present invention, the base layer element may also be constituted in a manner which is the same as or similar to the construction of the frontal layer element; for more details see the above comments with respect to the frontal layer element. In any event, the base layer element as a whole should, preferably, be sufficiently elastic and tough to inhibit spalling as well as achieve the desired deceleration of particles (or fragments) for final containment of the projectile that the composite is intended to stop.

The composite armor may, if desired, include a relatively flexible or deformable layer element which may be disposed between the energy absorbing body and the base layer element. In this case the energy absorbing body could be bonded to the base layer element in a manner which is indirect i.e. via the deformable layer element. This relatively flexible layer element, if present, may be constructed or adapted so as to serve as a type of shock absorber, absorbing tile movement as well as particals (or fragments); i.e. flexible properties thereof being relatively emphasized for such layer element. For this purpose, the deformable layer element may be constituted in a manner similar to the frontal layer element. However, the reinforcing fabric may, for example, be a high tensile strength woven fabric of polyethylene fibers. Suitable polyethylene fabric may be obtained from J. B. Martin Limitee, St-Jean-sur-Richelieu, Quebec, Canada under the trade designation Martintek-NSC-Dyneema SK60, the fiber thereof being obtained from Dyneema VoF of the Netherlands under the trade designation Dyneema SK60. The polymeric matrix for this flexible element can, for example, be based on a vinyl ester or polyester as described above, or any suitable matrix provided that the matrix is compatible with the shatter-resistant organic polymeric matrix which is used for the base layer element and the resultant lamina produced exhibits the desired relative flexibility. The matrix should also be compatible with the material used to bond the energy absorbing body to the surrounding layer elements. The polymeric matrix may be the same as that used for the adjacent base layer element.

The composite armor may also include a second auxiliary outer layer element covering the outer surface of the base layer element. This additional auxiliary layer element may function in a manner the same as or similar to the outer layer element which may cover the frontal layer element (e.g. to provide a decorative surface, to limit fire propagation, flame spread, etc . . .). The second auxiliary outer layer element may thus be constituted in a manner the same as or similar to the auxiliary outer layer element covering the frontal layer element; this second auxiliary layer element does not, however, have to be constituted in a manner which is the same i.e. it may, for example, incorporate more or different fabric laminae as desired.

The second auxiliary outer layer element and the deformable layer element may also be bonded (i.e. fixed) to the base layer element in any suitable manner and by any suitable means. Thus bonding may be effected by means of any suitable substance which will effectively bond the base layer element to the auxiliary outer layer element (or to the deformable layer element) provided that such bonding material is (chemically) compatible with the polymeric matrix material used for these elements (e.g. it may be a compatible organic polymeric substance). The bonding agent may, for example, be a vinyl ester, a polyester or epoxy as referred to above; i.e. the bonding agent may be based on the same resin ingredients used for the matrix of the layer elements.

A sufficient number of laminae or layers are, of course, to be used for the base layer element and, if present, the associated flexible and secondary layer elements so as to provide the desired characteristics i.e. in the case of the base layer element the desired level of projectile entrapment. The base layer element may, for example, include from 6 to 8 lamina of S-2 glass fabric (see above); the second auxiliary outer layer element may, for example, include from 2 to 4 lamina of 3M ceramic fabric (see above); and the flexible layer element may, for example, include from 4 to 6 lamina of Dyneema SK60 polyethylene fabric (see above).

In accordance with the present invention the frontal layer element and the base layer element effectively serve as carriers for the central energy absorbing body and they, desirably, should both have a high resistance to shattering when the composite armor is hit by a projectile. In this way the armor as a whole will remain more or less intact notwithstanding that one or more energy dissipating elements may have been shattered due to the impact of a projectile.

As mentioned earlier, in some instances it may be desired to modify the characteristics of the resinous matrix of the layer elements e.g. with respect to flame spread, smoke emission, vibration strength etc. . . . Accordingly, the resinous matrix may also include (known) additives for enhancing or improving characteristics of the layer elements. For example, to provide an enhanced high fire retardant resinous matrix for the outer layer elements which may overlay the frontal and base layer elements an additive such as aluminum trihydrate may be incorporated into the mass of the polymeric matrix.

Figure 2:
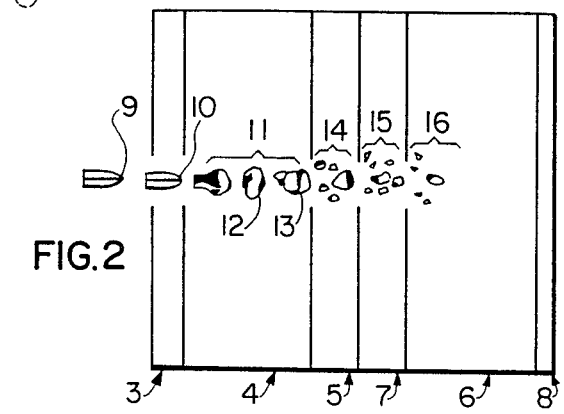
FIG. 2 is a sectional view of an embodiment of the present invention showing the manner in which a projectile is stopped thereby.

Turning to FIG. 2, this figure shows a cross-sectional view of an example embodiment of a composite in accordance with the present invention; for clarity the construction of the various elements is not detailed in order to illustrate the effects of penetration of the composite by a projectile; the elements are also not to scale.

The example embodiment shown in FIG. 2 is provided with an auxiliary outer layer element 3 which is disposed over or covers an underlying frontal layer element 4. For this embodiment the auxiliary outer layer element 3 is so constituted as to act as a preliminary abrasive, the underlying frontal layer element 4 of course being adapted to act to blunt the projectile before the projectile strikes a member of the energy absorbing body layer 5. In addition to a base layer element 6 the composite illustrated is also provided with a shock absorbing layer element 7 and a second auxiliary outer layer element 8, the second auxiliary outer layer element 8 covering or being disposed over the outer surface of the base layer element 6.

A projectile, typically having a pointed tip 9, is shown in FIG. 2 just before it enters the illustrated composite. The projectile passes through the auxiliary outer layer element 3 where some of the kinetic energy of the projectile is initially dissipated as the geometry of the projectile is initially deformed; i.e. the projectile displays a more rounded tip 10. Upon passing through the frontal layer element 4, the geometry of the projectile, indicated generally at 11, is increasingly deformed; the projectile becoming more and more blunt nosed so as effectively to increase its cross-sectional area; the projectile finally presenting an enlarged impact surface on its leading face 12.

The example embodiment shown in FIG. 2 has, as indicated above, an energy absorbing body layer 5 wherein the thus flattened leading face 13 of the projectile strikes an energy-dissipating means such as a ceramic tile. The impacted tile shatters (not shown) while the projectile itself is fragmented into particles indicted generally at 14.

The forward moving particles (or fragments) of the projectile, generally shown at 15 and 16 are then contained by the base layer element 6. The energy of the projectile being so reduced the particles thereof as well as of the tile become embedded into the base layer element 6 or if thrown backward (i.e. ricochet) become embedded in the frontal layer element 4.

Figure 3:
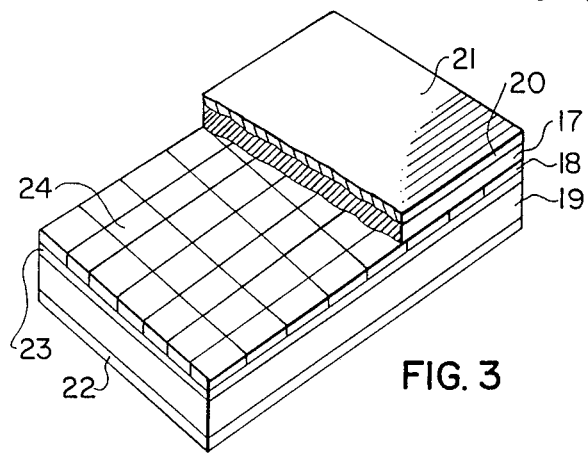
FIG. 3 is a perspective view in partial cutout of an embodiment of the present invention.

Turning to FIG. 3, a perspective view of an armor composite in accordance with the present invention is shown in partial cutout. The armor illustrated in FIG. 3 is presented by way of example only. The individual laminae or layers making up the layer elements are not shown; the elements are not to scale.

As can be seen from FIG. 3 the illustrated composite comprises a frontal layer element 17;

a base layer (backing) element 19; and a main energy absorbing body 18 disposed or sandwiched therebetween.

The illustrated composite is also provided with an auxiliary outer layer element 20 which covers the underlying frontal layer element 17. The surface 21 of the first covering layer portion 20 is the first to be impacted by a projectile.

The illustrated composite is further provided with a second auxiliary outer layer element 22 and a shock absorbing layer element 23.

The energy absorbing body 18 is made up of a single layer of energy-dissipating means consisting of a plurality of (ceramic) tiles, one of which is designated by the numeral 24; the numeral 24 also pointing to a major surface of the tile. The tiles are in side-by-side relationship closely adjacent to one another if not abutting. The energy absorbing body 18 could of course be composed of square tiles, rectangular tiles, strips, etc..; as indicated previously, various forms and dispositions of such energy absorbing bodies are known, see the above mentioned patents and in particular U.K. patent application No. 2,190,077.

By way of example only, a unitary composite armor having the basic structure illustrated in FIG. 3 (unless otherwise indicated) may be formed, as set out below.

In particular, an embodiment of a composite armor in accordance with the present invention may be obtained from the following components by first assembling the desired layup therefrom which is then cured under heat and pressure into a unitary mass:

(a) resin matrix

Apart from those fabrics impregnated with a fire retardant matrix, all of the other fabrics may be impregnated with a common matrix as defined below.

The fire retardant matrix may consist of
100 parts by weight of DERAKANE 510N
100 parts by weight of aluminum trihydrate
1.5 parts by weight of Percadox 16/35 from Akzo Chemie America U.S.A. (a special peroxide allowing for a short cycle time of about 5 minutes). The common matrix may consist of
100 parts by weight of DERAKANE 510N
1.5 parts by weight of Percadox.

(b) Reinforcing Fabric

As a ceramic fabric, AF-30 (see above) may be used.
As a S-2 glass fabric, Martintek-NCS-S2 (see above) may be used.
As a polyethylene fabric Martintek-NCS-Dyneema SK60 (see above) may be used.

(c) Energy absorbing body

Alumina tiles (0.25 ×4×4 inches in dimension) may be used as energy-dissipating means; such tiles may be obtained from Certel Limited, Quebec, Canada.

Before these fabrics are impregnated with respective resin matrix they may be heat treated as necessary. In the present case the ceramic fabric is first subjected to a heat treatment at 950° F. for 3 hours in order to remove or destroy any surface coating thereon which may interfere with bonding. The other fabrics may also be heat treated at 120° F. for at least one hour.

It is also to be noted that apart from the presence of the aluminum trihydrate, the fire retardant matrix uses the same basic resin ingredients as the common matrix referred to above; i.e. the fire retardant matrix comprises a combination of the common matrix and a fire retardant additive. Thus for the present example, the bonding agent which binds the auxiliary outer layer elements and the shock absorbing element to respective frontal and base layer elements is based on the same basic resin ingredients as the common matrix. Additionally, for the present example, the bonding agent which binds the tiles to the other layer elements is also based on the same basic resin ingredients as the common matrix.

Referring back to FIG. 3 the preparation of the layup for an example embodiment of a composite armor using the above defined components may proceed by spreading a release agent (e.g. having a wax base) on a 20 gauge steel or aluminum sheet and stacking layers thereon to obtain a layup wherein (a) the auxiliary outer layer element 20 is obtained from two layers of AF-30 pre-impregnated with 35% by weight fire retardant matrix based on the total weight of the impregnated fabric;

(b) the frontal layer element 17 is obtained from 6 to 8 layers of Martintek-NCS-S2 pre-impregnated with 35% by weight common matrix based on the total weight of the impregnated fabric. The layers of impregnated fabric are oriented 0/90 namely, the warp of one fabric layer is rotated 90 degrees with respect to the warp of adjacent layers;

(c) the energy absorbing body 18 is made up of a layer of closely adjacent alumina tiles. Although not referred to with respect to FIG. 3 the body 18 may include two layers of AF-30, one layer abutting each of the major surfaces of the tiles and each layer of AF-30 being pre-impregnated with 35% by weight common matrix based on the total weight of the impregnated fabric;

(d) the shock absorbing layer element 23 is obtained from 4 to 6 layers of Martintek-NCS-Dyneema SK60 pre-impregnated with 35% by weight common matrix based on the total weight of the impregnated fabric. The layer of impregnated fabric are oriented 0/09 namely, the warp of one fabric layer is rotated 90 degrees with respect to the warp of adjacent layers;

(e) the base layer element 19 is obtained from 6 to 8 layers of Martintek-NCS-S2 pre-impregnated with 35% by weight common matrix based on the total weight of the impregnated fabric. The layers of impregnated fabric are oriented 0/09 namely, the warp of one fabric layer is rotated 90 degrees with respect to the warp of adjacent layers; and (f) the second auxiliary outer layer element 22 is obtained from 2 to 4 layers of AF-30 pre-impregnated with 35% by weight fire retardant matrix based on the total weight of the impregnated fabric.

A steel or aluminum sheet is then placed on top of the uncured layup which is then placed in a press preheated to from 170° to 190° F. The layup is then subjected to a pressure of from about 30 to 50 p.s.i.g. for a period of about 5 minutes. The laminate is allowed to thoroughly cool to room temperature and is then heat treated for at least from about 2 to 3 hours at from about 160° to 200° F. The resulting rigid product is a composite wherein the various fibrous materials and the tiles are embedded or integrated in the overall structure or mass of the composite.

It is possible to obtain an armor composite prepared as above having a thickness of about 1 inch and weighing about 10 lbs/sq ft.

An example embodiment of a composite armor, prepared as outlined above, from a layup comprising (a) an auxiliary outer layer element obtained from 2 layers of impregnated AF-30 fabric, (b) a frontal layer element obtained from 8 layers of impregnated Martintek-NCS-S2 fabric, (c) the specified ceramic tile layer, (d) a shock absorbing layer element obtained from 6 layers of impregnated Martintek-NCS-Dyneema SK60 fabric, (e) a base layer element obtained from 8 layers of impregnated Martintek-NCS-S2 fabric, and (f) a second auxiliary outer layer element obtained from 4 layers of impregnated AF-30 fabric, can effectively stop a projectile shot from a 7.62 mm ×51 NATO caliber firearm (designation C-21 as per the Canadian army standard) or a 5.56 mm ×45 caliber firearm (designation US M193 ball, including the SS-109 tungsten or hardened core version thereof) and fragment simulator of 0.50 inch (in accordance with MILP46593 A-ORD) having velocities higher than 2000 fps., with no penetration and no ricochet or spalling, the projectile being shot at a range of 15 feet from the composite armor and at 90° or obliquely to the surface of the armor.

The embodiments of the invention in which an exclusive property or privilege is claimed are as defined as follows:

1. A unitary anti-ballistic composite armor comprising
   a base layer element,
   and
   an energy absorbing body, said base layer element comprising a plurality of layers of reinforcing fibrous material embedded, in laminar relationship, in an organic polymeric shatter-resistant matrix, said energy absorbing body comprising a plurality of energy-dissipating means of a predetermined size and shape individually shatterable in response to the impact of a high kinetic energy projectile thereagainst, said base layer element being adapted to entrap particles produced on impact of the projectile with said energy absorbing body, characterized in that the composite includes
   a frontal layer element, and
   said energy absorbing body is disposed between
   the frontal and base layer elements, said frontal layer element comprising a plurality of layer of reinforcing fibrous material embedded, in laminar relationship, in an organic shatter-resistant polymeric matrix, said frontal layer element being capable of deforming the geometry of the projectile, and said energy absorbing body being bonded to said frontal and base layer elements.

2. A composite as defined in claim 1 wherein said frontal layer element comprises a plurality of layers of reinforcing woven fabric embedded, in laminar relationship, in an organic shatter-resistant polymeric matrix.

3. A composite as defined in claim 2 wherein said reinforcing woven fabric comprises a plurality of layers formed of yarns disposed in a straight manner.

4. A composite as defined in claim 3 wherein said reinforcing woven fabric is made of a fiber glass.

5. A composite as defined in claim 2 wherein said reinforcing woven fabric has an impact strength of 200 ft-lb/in$^2$ or higher.

6. A composite as defined in claim 5 wherein said reinforcing woven fabric is made of a fiber glass.

7. A composite as defined in claim 3 wherein said reinforcing woven fabric has an impact strength of 200 ft-lb/in$^2$ or higher.

8. A composite as defined in claim 7 wherein said reinforcing woven fabric is made of a fiber glass.

9. A composite as defined in claim 2 wherein said base layer element comprises a plurality of layers of reinforcing woven fabric embedded, in laminar relationship, in an organic shatter-resistant polymeric matrix.

10. A composite as defined in claim 9 wherein the reinforcing woven fabric of said frontal and base elements comprises a plurality of layers formed of yarns disposed in straight manner.

11. A composite as defined in claim 10 wherein the reinforcing woven fabric of said frontal and base elements is made of a fiber glass.

12. A composite as defined in claim 9 wherein the reinforcing woven fabric of said frontal and base elements has an impact strength of 200 ft-lb/in$^2$ or higher.

13. A composite as defined in claim 12 wherein the reinforcing woven fabric of said frontal and base elements is made of a fiber glass.

14. A composite as defined in claim 10 wherein the reinforcing woven fabric of said frontal and base elements has an impact strength of 200 ft-lb/in$^2$ or higher.

15. A composite as defined in claim 14 wherein the reinforcing woven fabric of said frontal and base elements is made of a fiber glass.

16. A composite as defined in claim 15 wherein said energy absorbing body comprises a plurality of suitable ceramic tiles disposed in side-by-side relationship so as to define a layer.

17. A composite as defined in claim 16 wherein said ceramic tiles are made of aluminum oxide.

18. A composite as defined in claim 17 wherein the organic shatter-resistant polymeric matrix of the frontal layer element is the same as the organic shatter-resistant polymeric matrix of the base layer element.

19. A composite as defined in claim 1 wherein the composite includes an auxiliary outer layer element bonded to the frontal layer element, the frontal layer element being disposed between said auxiliary outer layer element and said energy absorbing body, said auxiliary outer layer element being adapted to provide fire protection for said frontal layer element, said auxiliary outer layer element comprising a plurality of layers of reinforcing fibrous material embedded, in laminar relationship, in an organic shatter-resistant polymeric matrix and the reinforcing fibrous material of said auxiliary outer layer element being made of a ceramic material.

20. A composite as defined in claim 19 wherein the composite also includes a second auxiliary outer layer element bonded to the base layer element, the base layer element being disposed between said second auxiliary outer layer element and said energy absorbing body, said second auxiliary outer layer element being adapted to provide fire protection for said base layer element, said second auxiliary outer layer element comprising a plurality of layers of reinforcing fibrous material embedded, in laminar relationship, in an organic shatter-resistant polymeric matrix and the reinforcing fibrous material of said second auxiliary outer layer element being made of a ceramic material.

21. A composite as defined in claim 4 wherein the composite includes an auxiliary outer layer element bonded to the frontal layer element, the frontal layer element being disposed between said auxiliary outer layer element and said energy absorbing body, said auxiliary outer layer element being adapted to provide fire protection for said frontal layer element, said auxiliary outer layer element comprising a plurality of layers of reinforcing woven fabric embedded, in laminar relationship, in an organic shatter-resistant polymeric matrix and the reinforcing woven fabric of said auxiliary outer layer element being made of a ceramic material.

22. A composite as defined in claim 21 wherein the composite also includes a second auxiliary outer layer element bonded to the base layer element, the base layer element being disposed between said second auxiliary outer layer element and said energy absorbing body, said second auxiliary outer layer element being adapted to provide fire protection for said base layer element, said second auxiliary outer layer element comprising a plurality of layers of reinforcing woven fabric embedded, in laminar relationship, in an organic shatter-resistant polymeric matrix and the reinforcing woven fabric of said second auxiliary outer layer element being made of a ceramic material.

23. A composite as defined in claim 8 wherein the composite includes an auxiliary outer layer element bonded to the frontal layer element, the frontal layer element being disposed between said auxiliary outer layer element and said energy absorbing body, said auxiliary outer layer element being adapted to provide fire protection for said frontal layer element, said auxiliary outer layer element comprising a plurality of layers of reinforcing woven fabric embedded, in laminar relationship, in an organic shatter-resistant polymeric matrix and the reinforcing woven fabric of said auxiliary outer layer element being made of a ceramic material.

24. A composite as defined in claim 23 wherein the composite also includes a second auxiliary outer layer element bonded to the base layer element, the base layer element being disposed between said second auxiliary outer layer element and said energy absorbing body, said second auxiliary outer layer element being adapted to provide fire protection for said base layer element, said second auxiliary outer layer element comprising plurality of layers of reinforcing woven fabric embedded, in laminar relationship, in an organic shatter-resistant polymeric matrix and the reinforcing woven fabric of said second auxiliary outer layer element being made of a ceramic material.

25. A composite as defined in claim 13 wherein the composite includes an auxiliary outer layer element bonded to the frontal layer element, the frontal layer element being disposed between said auxiliary outer layer element and said energy absorbing body, said auxiliary outer layer element being adapted to provide fire protection for said frontal layer element, said auxiliary outer layer element comprising a plurality of layers of reinforcing woven fabric embedded, in laminar relationship, in an organic shatter-resistant polymeric matrix and the reinforcing woven fabric of said auxiliary outer layer element being made of a ceramic material.

26. A composite as defined in claim 25 wherein the composite also includes a second auxiliary outer layer element bonded to the base layer element, the base layer element being disposed between said second auxiliary outer layer element and said energy absorbing body, said second auxiliary outer layer element being adapted to provide fire protection for said base element, said second auxiliary outer layer element comprising a plurality of layers of reinforcing woven fabric embedded, in laminar relationship, in an organic shatter-resistant polymeric matrix and the reinforcing woven fabric of said second auxiliary outer layer element being made of a ceramic material.

27. A composite as defined in claim 18 wherein the composite includes an auxiliary outer layer element bonded to the frontal layer element, the frontal layer element being disposed between said auxiliary outer layer element and said energy absorbing body, said auxiliary outer layer element being adapted to provide fire protection for said frontal layer element, said auxiliary outer layer element comprising a plurality of layers of reinforcing woven fabric embedded, in laminar relationship, in an organic shatter-resistant polymeric matrix and the reinforcing woven fabric of said auxiliary outer layer element being made of a ceramic material.

28. A composite as defined in claim 25 wherein the composite also includes a second auxiliary outer layer element bonded to the base layer element, the base layer element being disposed between said second auxiliary outer layer element and said energy absorbing body, said second auxiliary layer element being adapted to provide fire protection for said base layer element, said second auxiliary outer layer element comprising a plurality of layers of reinforcing woven fabric embedded, in laminar relationship, in an organic shatter-resistant polymeric matrix and the reinforcing woven fabric of said second auxiliary outer element being made of a ceramic material.

* * * * *